United States Patent [19]
Gallery

[11] Patent Number: 5,973,689
[45] Date of Patent: Oct. 26, 1999

[54] CURSOR CONTROL WITH USER FEEDBACK MECHANISM

[75] Inventor: Richard D. Gallery, Horley, United Kingdom

[73] Assignee: U.S. Philips Corporation, New York, N.Y.

[21] Appl. No.: 08/959,783

[22] Filed: Oct. 29, 1997

[30] Foreign Application Priority Data

Oct. 30, 1996 [GB] United Kingdom .................... 9622556

[51] Int. Cl.$^6$ ...................................................... G06F 3/14
[52] U.S. Cl. ......................... 345/339; 345/145; 345/157; 345/160
[58] Field of Search ..................... 345/145, 157, 345/160, 339, 347, 336, 338

[56] References Cited

U.S. PATENT DOCUMENTS

| | | | |
|---|---|---|---|
| 4,752,772 | 6/1988 | Litt et al. ................................. | 345/160 |
| 5,091,865 | 2/1992 | Yamada et al. .......................... | 434/114 |
| 5,186,629 | 2/1993 | Rohen ...................................... | 434/114 |
| 5,223,828 | 6/1993 | McKiel, Jr. ......................... | 340/825.19 |
| 5,270,688 | 12/1993 | Dawson et al. .......................... | 345/150 |
| 5,287,102 | 2/1994 | McKiel, Jr. ......................... | 340/825.19 |
| 5,714,978 | 2/1998 | Yamanaka et al. ..................... | 345/157 |
| 5,825,308 | 10/1998 | Rosenberg ............................... | 345/145 |

FOREIGN PATENT DOCUMENTS

0607580A1  7/1994  European Pat. Off. .......... G06F 3/00

OTHER PUBLICATIONS

"Glimpses of Heaven, Visions of Hell" by B. Sherman & P Judkins, Pub Hodder & Stoughton pp. 54–56.
IBM Technical Disclosure Bulletin, vol. 34, No. 10A, Mar. 1992, pp. 223–225.

*Primary Examiner*—Raymond J. Bayerl
*Assistant Examiner*—Cuong T. Thai
*Attorney, Agent, or Firm*—Gregory L. Thorne

[57] ABSTRACT

A feedback means is provided in conjunction with a cursor control mechanism for a two- or three-dimensional graphic user interface. Feedback levels are determined by tonal variation (grey scale or color component) at the pixel (P) currently indicated by the cursor. Suitably, the levels are set by generating differentials across a patch of pixels (A) surrounding the indicated pixel, with differential generation in mutually perpendicular directions (X and Y) providing for independent feedback in two or three directions. The technique enables interface features such as window boundaries (36) or textured patches to be identified to the user without specially authored software being required for those features to trigger feedback when indicated.

19 Claims, 5 Drawing Sheets

CURSOR CONTROL WITH USER FEEDBACK MECHANISM

The present invention relates to data processing systems having useroperable devices for controlled movement of a cursor about a graphic user interface presented to the user of the system. In particular, the invention relates to systems having means for providing feedback to the user, particularly, but not exclusively, tactile feedback, to provide the user with additional information relating to the current cursor position in relation to features of the graphic user interface.

BACKGROUND OF THE INVENTION

One example of such a feedback mechanism is described in European Patent Application EP-A-0 607 580 (Selker/IBM) wherein a feedback signal is generated on status information associated with a cursor, such status information including the window handle of the cursor. An indicating rod mechanism is described in which a rod is attached to an actuator at one of its ends: a transitory feedback signal generated by the host computer system on the basis of status information activates the actuator to apply a force to the indicating rod. This rod, which may be mounted in a pointing stick device amongst the keys on a keyboard to the host computer system, or within a mouse cursor control, is arranged such as to press against the finger tip of a user on activation of the actuator connected to the opposite end of the rod. By activation on the basis of status information, such as to indicate by movement of the rod such features as window boundaries and handles, the system of EP-A-0 607 580 aims to enhance a user's perception of exactly when the cursor is in a position to operate or manipulate features displayed on screen without having to slow down movement of the cursor about the screen—either to watch for a change in the form of the displayed cursor to indicate location or as a result of the feedback being provided in the form of physical resistance to movement of the cursor control.

Alternative forms of feedback accompanying cursor movement are described in U.S. Pat. No. 5,186,629 (Rohen/IBM) which describes a computer interface for blind and partially sighted users. Cursor location and selection of menus is indicated by audio feedback including tone generation and speech synthesis. In addition, tactile feedback is provided in the form of a mild AC current passed to the user's hand through a pad on the mouse. In this system, the audio and tactile cues assist the user to build a mental picture of the user interface.

A problem with both of the above systems is their reliance on specific authoring for the user interface presentation in order to provide the cursor status information, such as when the cursor is positioned over a window handle or actuating icon, in order to trigger the tactile or other feedback generation. As tactile and other feedback mechanisms become more prevalent, software packages including the necessary cues for actuation of such mechanisms will become more widespread. With each being presently reliant on the other, user acceptance of tactile and other feedback mechanisms as expected or required features may be slow in coming.

SUMMARY OF THE INVENTION

It is therefore an object of the present invention to provide a means for generating feedback cues in relation to a cursor controlled user interface independently of any software control functions governing the operation of that interface.

In accordance with the present invention there is provided a cursor control system for controlling a cursor on a pixel display, comprising: a control means for generating cursor control signals and transmitting said cursor control signals to said display, and a feedback means for indicating to an operator of said cursor control device a parameter setting, characterised by monitoring means arranged to determine a tone level for at least a first pixel of the display overlaid by the cursor, said parameter setting indicated to the user being derived by feedback control means at least partly from the determined tone level.

Also in accordance with the present invention there is provided a computer system, comprising a pixel display for displaying a cursor, a host computer coupled to said pixel display; and a cursor control means for generating cursor control signals coupled to said host computer, said host computer receiving said cursor control signals, generating cursor display signals and sending said cursor display signals to said pixel display, said cursor control means comprising a feedback means for indicating to an operator of said cursor control means a parameter setting, characterised by monitoring means arranged to determine a tone level for at least a first pixel of the display overlaid by the cursor, said parameter setting indicated to the user being derived by feedback control means at least partly from the determined tone level.

The tone level determined may be the grey level or the level of one or more pixel color components for the said at least one pixel, and the feedback means may operate when the determined tone level exceeds a first threshold value, or be operable to output a continuously varying feedback level directly determined by the instantaneous tone level. The monitoring means may be arranged to determine tone level in one or more further areas surrounding the first area (for example in each of eight pixels surrounding a first selected pixel), to determine a differential for tone variation in at least one direction across the first and further areas, and to generate the feedback to the user at a level determined by the instantaneous differential. In such an arrangement, the monitoring means is suitably arranged to determine differentials in two mutually perpendicular directions across the first and further areas, and the feedback means may then comprise two independently operated feedback means respectively indicating tone variation in the two directions.

In terms of a typical windows-based computer interface, window boundaries are clearly delineated by changes in grey level (or individual color component level) as are buttons and sliders. The differential at the current cursor location, in one or both of the X and Y directions, produces a value indicating the extent of change in the grey or color component level which in turn indicates window boundaries. In an alternative arrangement, the monitoring means may include cursor pixel storage means arranged to maintain a record of overwritten display pixel values, with the differential for tone variation being derived from the tone variation along the line of the cursors recent movement.

The feedback means may include force generation means arranged to apply a force to the body of a user of the apparatus at a level controlled by the determined tone level. Alternatively, such force generation means may be applying force at a level determined by some other factor, with this force then modulated by an amount derived from the determined tone level.

The present invention is not limited to two-dimensional interfaces, and has application where the display represents a three-dimensional computer-generated environment and the cursor is an icon movable under user control in said three dimensions, the apparatus for such use suitably including collision (or contact) detection means operable to determine when the cursor is in contact with features of the virtual environment, with the feedback means becoming operable while such contact is maintained.

BRIEF DESCRIPTION OF THE DRAWINGS

Further features and advantages of the present invention will become apparent from reading of the following description of preferred embodiments, given by way of example only, and with reference to the accompanying drawings, in which.

DESCRIPTION OF THE PREFFERED EMBODIMENTS

Figure 1:
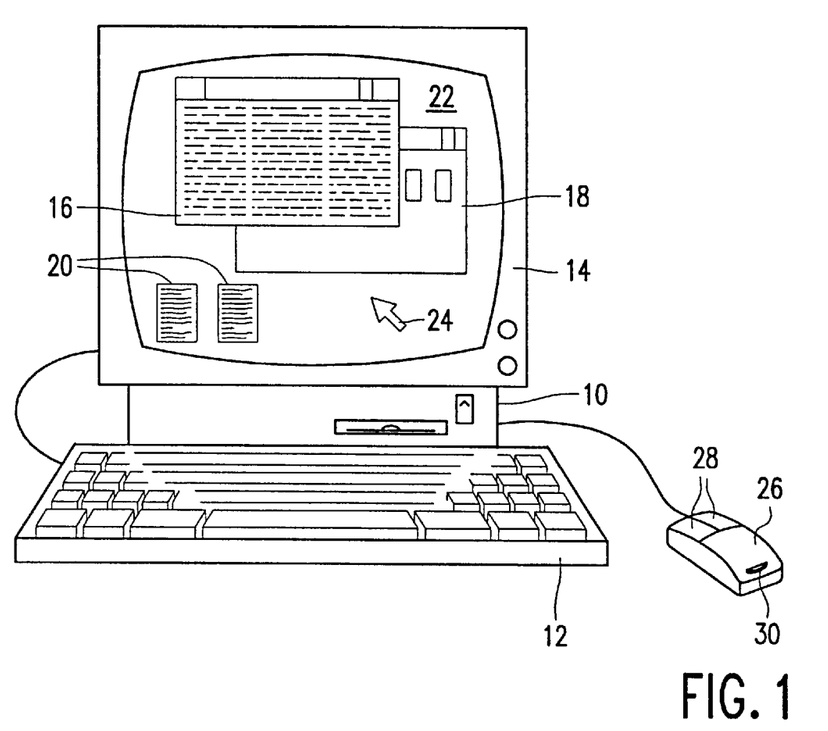
FIG. 1 represents a personal computer (PC), with two dimensional graphic user interface, embodying the present invention.

Considering first a simple implementation of the present invention providing tactile cues in conjunction with the presentation of a conventional two dimensional graphic user interface, FIG. 1 represents a typical personal computer (PC) apparatus, comprised of a personal computer 10 with input from a keyboard 12 and display via a monitor screen 14. As shown, the graphic user interface is of the well-known window type, with two windows 16,18 being shown in the "open" position and two further windows "closed" and available to the user as icons 20. The windows 16,18 and icons 20 are generally positioned over a background "wallpaper" 22 which may comprise a simple white or colored background or a more complex textured pattern: user selectable choice from a menu of different wallpapers is a feature of a number of well known graphic user interface packages. User selection, activation and manipulation of icons and windows (together with associated menu button and slider controls) is via cursor 24 which may be moved around the screen by operation of directional keys on keyboard 12 or, in a more user-friendly way, by use of a further user input device (UID) such as a mouse 26, trackerball or joystick (not shown). The mouse 26 or other UID is typically provided with one or more buttons 28 by which icons, cursor buttons or menu items are activated when the cursor 24 is positioned over them. The techniques for generation and cursor operation of such graphic user interfaces will be familiar to those of ordinary skill in the art and, except where required to illustrate the operation of the present invention, they will not be further described.

In operation, as the cursor 24 is moved about the screen, the coincidence of the cursor with the edges of icons or window boundaries is indicated to the user via a force feedback mechanism such as a simple actuator 30 mounted on the mouse 26 and positioned under the heel of the user's hand, the actuator 30 "tapping" the user's hand to indicate that a boundary has just been crossed. As will be understood from reading of the following, the particular form of feedback device is not germane to the operation of the present invention: in the most basic implementation, it need simply be capable of indicating to the user that a boundary has been crossed, and it may comprise tactile means such as actuators and/or audio feedback such as simple bleeps. More complex forms of device may be used and, for the sake of illustration, some different configurations of feedback means and useful (but optional) features thereof will be described hereinafter.

Figure 2:
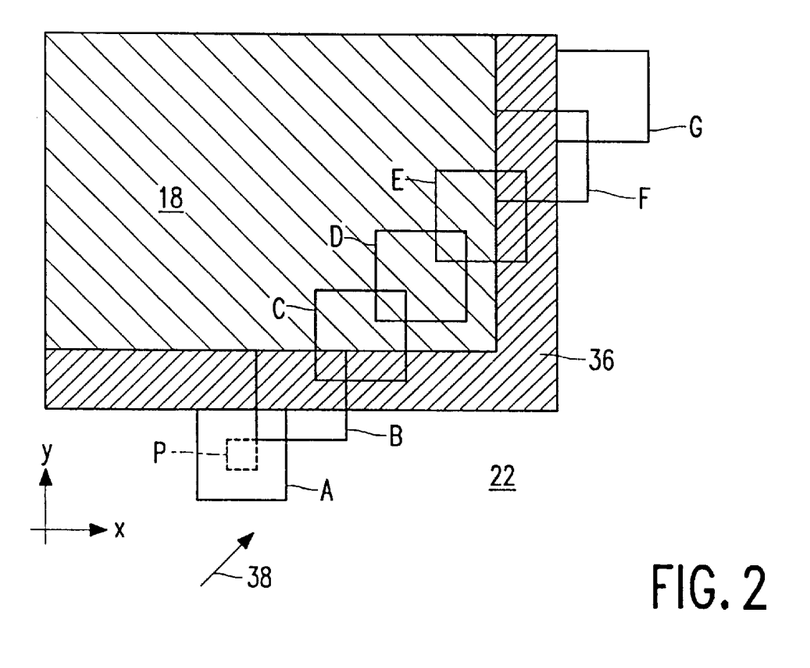
FIG. 2 is an expanded view of a part of the pixel display of FIG. 1 illustrating operation of the present invention.

FIG. 2 schematically illustrates operation of the present invention, and shows a portion of the display of FIG. 1 around the bottom right hand corner of the window 18. The window has a dark border 36 which is two pixels wide with different background colors being used within the window 18 and for the screen wallpaper 22. Movement of the cursor 24 across the corner of window 18 is indicated generally by arrow 38. A series of 3×3 pixel patches A to G are shown along the path of the cursor. For each of these patches, the change in the grey level and/or one or more color component levels (referred to generally hereinafter as tone level) is used to trigger tactile feedback to the user and preferably additionally to set the level for the same. Where just a single tactile feedback device, such as the actuator 30 on the mouse 26 of FIG. 1, is provided, the differing overall tone levels in each of the patches A to G may be used to set a respective single force level for the actuator when the cursor is at the position at the center of the respective patch. In terms of the example, the actuator 30 will be activated when the cursor is at positions B, C, E and F, with generally greater application force at positions B and F (due to the greater tone contrast between the border 36 and wallpaper 22 compared to that between the border and the background of the window 18): at positions A, D and G, with constant tone across the patch, no feedback is generated.

In order to improve the cues fed back to the user, feedback is derived and applied in two mutually perpendicular directions (suitably the screen X and Y coordinates) in order to identify to the user when horizontal or vertical boundaries are being crossed. Returning to the example of FIG. 2, this is achieved by taking the differential of the tone level across each of the patches A to G in the X and Y directions in order to provide independent feedback for each of these directions. In terms of the example, there will again be no feedback in either direction at positions A, D or G; at positions B and C there will be feedback in the Y direction but, due to the horizontal edge, the tone is constant across the patches in the X direction and hence no horizontal feedback will be generated. In contrast, at positions E and F, the tone is constant in the Y direction, giving no feedback, but has a tone gradient leading to generation of feedback in the horizontal X direction.

Figure 3:
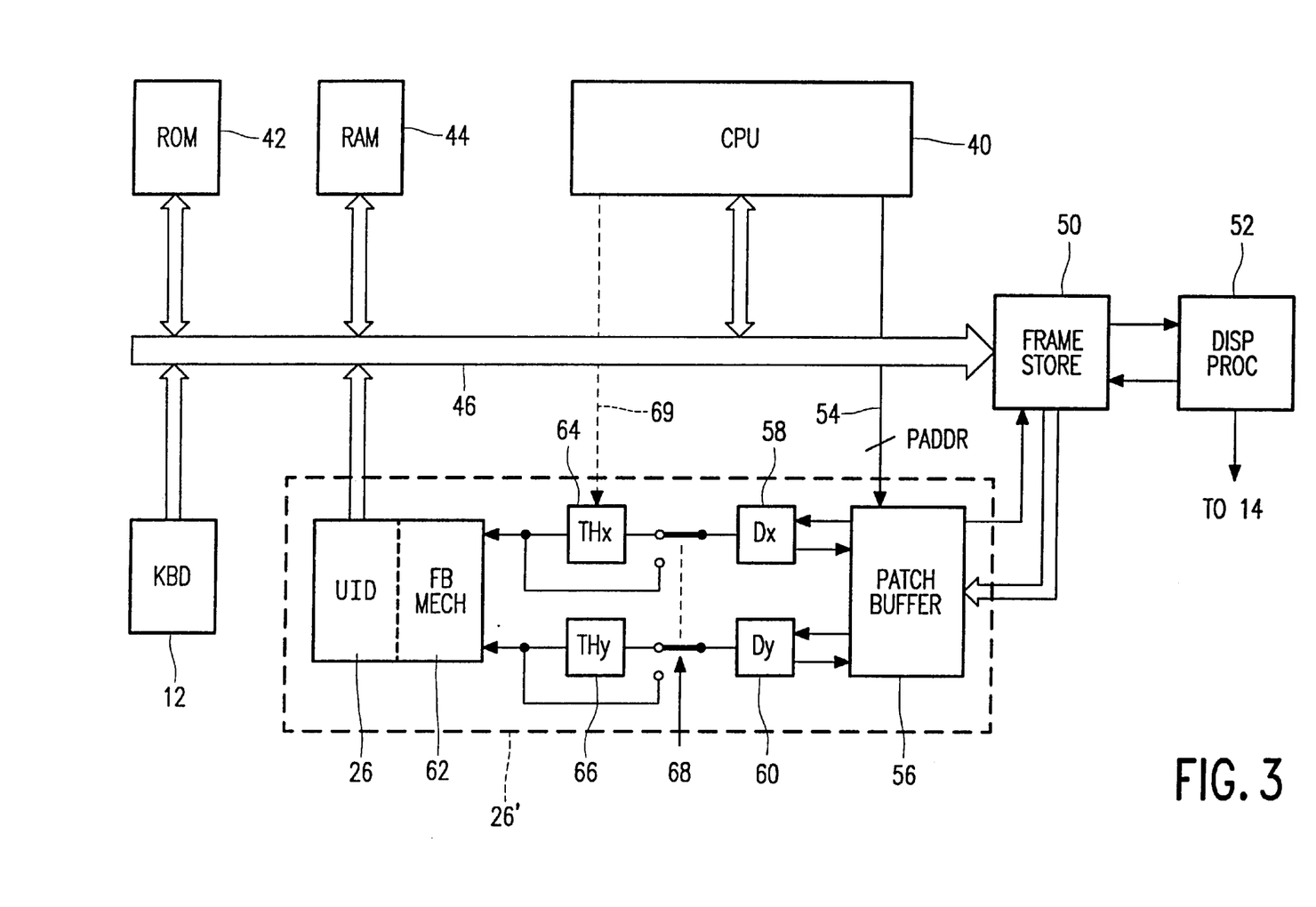
FIG. 3 is a block schematic diagram showing functional features of the embodiment of FIG. 1.

FIG. 3 is a block schematic diagram of the PC based embodiment of FIG. 1. In generally conventional manner, a central processing unit 40 is coupled with read-only and random access memories 42,44 via a data and addressing bus 46. Data input is via the keyboard 12 and UID 26 (such as the mouse shown in FIG. 1 or a trackerball or joystick mechanism). Note that UID 26 may be a relatively simple device with the majority of component operations for deriving feedback levels being carried out within the PC, or it may be a more complex device with a degree of stand-alone capability and comprising some or all of those components contained within dashed outline 26'.

Images for display are assembled in digital form in a frame store 50 from which the data is read by display processor 52 for supply to the display 14. In order to generate the feedback levels, the CPU 40 outputs a patch address PADDR on line 54 to a patch buffer 56: this patch address identifies the 3×3 pixels of the patch centered on the current cursor location. On receipt of this patch address, the patch buffer 56 reads the pixel values from the frame store 50, following which they are synchronously read from the patch buffer 56 to each of a pair of filter stages 58,60 (one each for the X and Y directions). In an alternative arrangement (not shown) particularly suited to a stand alone UID arrangement, the patch buffer contents may be obtained by sampling the analogue output from the display processor 52 and then digitising for supply to the filter stages. Following the filtering to give respective gradients Dx and Dy the filtered values may be passed via a serial port to the force feedback mechanism 62 within the user interface device 26, or the values may first be submitted to one or more optional further treatments. One optional treatment (not shown) is to mix or sum the values of Dx and Dy to provide a single feedback level value: this would be required by, for example, the mouse 26 shown in FIG. 1 which has only a single force feedback device. A further optional treatment is to pass Dx and Dy through respective thresholding stages 64,66 in order to block values of Dx and Dy below respective pre-determined threshold values. Thresholding, which may be switched in or out by toggle switch 68 and the level of which may be controllably varied (under control of the CPU on line 69), may be required where, for example, the screen wallpaper 22 is finely textured. In order to avoid activating the feedback means when the cursor is being dragged across a large area of wallpaper 22, the user may choose to switch off the tactile feedback or a threshold level may be set slightly above the average texture gradient of such wallpaper. In the latter case, the boundaries of windows and icons will have sufficient contrast to the background to enable them to be seen by the user and consequently sufficient tone gradient to exceed the threshold.

In other situations, it may be desirable to provide feedback for all levels of tone gradient, and one particular instance of this is in terms of interaction with three dimensional computer modelled environments (so-called virtual landscapes) where the cursor may be in the form of a representation of the user's hand or some other form of manipulator which is movable in three dimensions within the virtual landscape in response to operation of one or more user input devices. In operation, the user is suitably provided with force feedback means to restrict motion or at least indicate when the cursor comes into contact with a supposedly "solid" object modelled within the virtual landscape. Traditionally, in order to give the impression of texture through force feedback, for example when running the cursor (virtual hand) along a representation of a brick wall within the virtual landscape, it has been necessary to model the individual bricks and spaces in between them to provide a complete three dimensional model on which the force feedback may be based. By incorporating the present invention, objects such as the brick wall example may be modelled as plain surfaces onto which the brick texture is mapped in conventional fashion. The feedback force generated due to the cursor collision or contact with the wall is modulated by the tone differentials derived as before to provide tactile feedback within the three dimensional environment.

Figure 4:
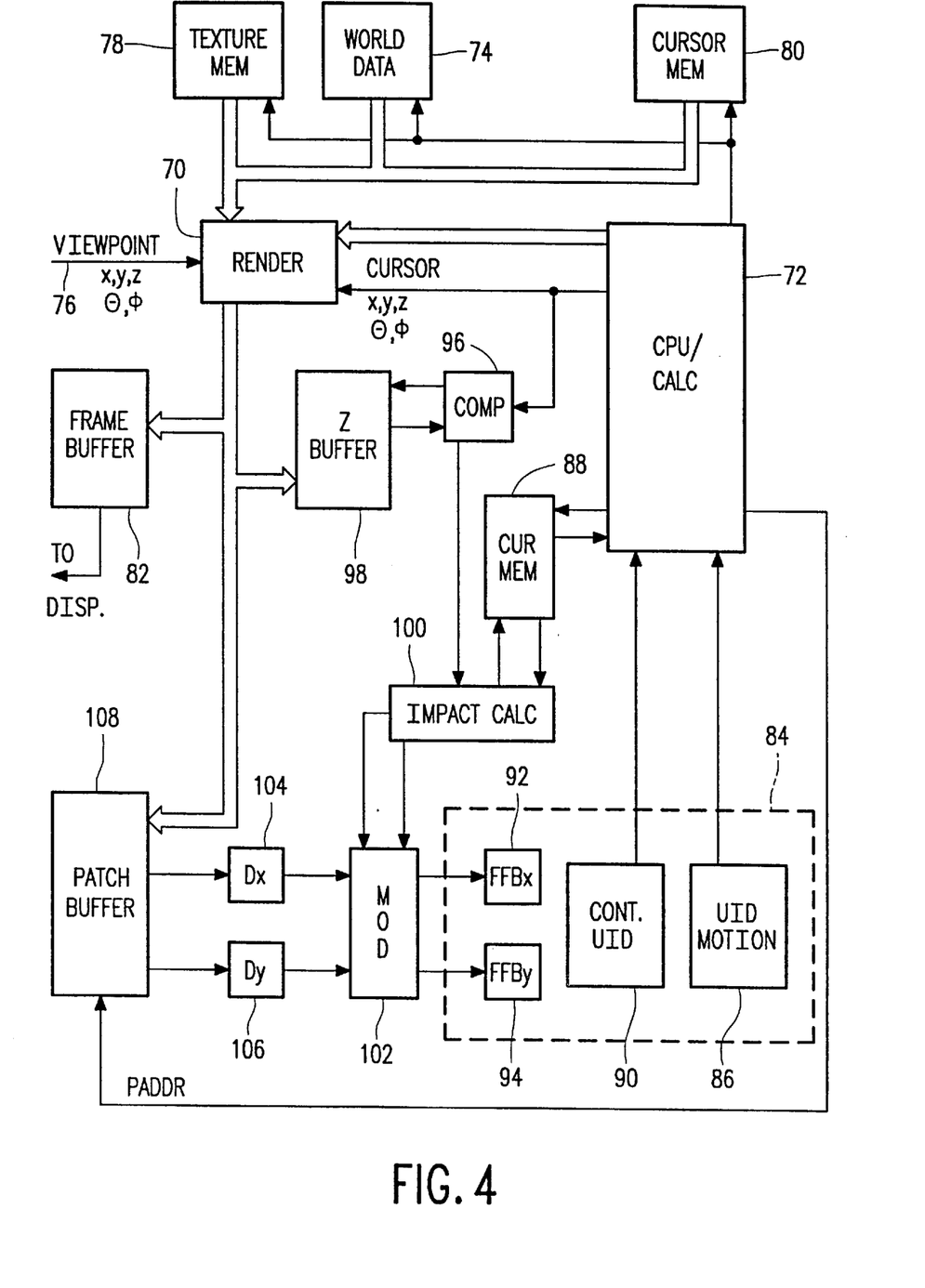
FIG. 4 is a block schematic diagram of means for generating a three dimensional virtual environment, and user operable means for interacting with the same, according to a further embodiment of the present invention.

FIG. 4 schematically illustrates a part of an architecture for generating and presenting to a user such a virtual landscape. The view of the landscape is generated by rendering stage 70 under control of a CPU 72. The generated image is based on data from a first store 74 which specifies the layout of the virtual landscape and also on the basis of viewpoint position (X,Y,Z) and orientation ($\theta,\phi$) which may be pre-set or input (on line 76) from calculating means (not shown) monitoring movements of, for example, a head mounted display worn by the user. On the basic geometrical surfaces of objects and features of the virtual landscape as specified in the data from memory 74, various textures may be mapped from data in a further memory store 78, coupled with the rendering stage 70. Texture mapping is a well-known technique and avoids the need to generate three dimensional models to extremely fine detail.

As with the simple two dimensional interface described previously, a user controlled cursor is provided, which cursor may be in the form of a hand or other virtual manipulator: the appearance of this cursor, together with data and/or rules governing its operation, is stored in a further memory 80 for calling by the rendering stage 70 in order to generate a representation of the cursor overlying the virtual landscape at the appropriate location (the cursor location and orientation being supplied to the rendering stage from the CPU 72). Having generated either a single or a stereo pair of images for display on a flat screen or stereoscopic display respectively, the composed images are passed to a frame buffer 82 for subsequent output to a display device.

The user input device indicated generally by dashed line 84, includes means 86 for detecting motion of the device and passing it to the CPU 72. With reference to a record of recent motion history for the cursor, stored in cursor motion memory 88, the CPU 72 calculates the current cursor position for supply to rendering stage 70. As shown, the UID 84 has a further connection to CPU 72 through which operation of one or more controls or switches on the UID 84 is notified to the CPU 72 - perhaps to indicate that the cursor is to grab or release an object within the virtual landscape in like manner to operation of conventional mouse buttons with a two dimensional interface. As will be recognised, the form of controls 90 on UID 84 will depend on a number of features such as the design of virtual landscape components, the design of the cursor, and any limitations placed on how the two may interact.

As shown, the UID 84 also includes first and second feedback mechanisms 92 and 94 which respectively provide force feedback to the user in the X and Y directions to indicate collision between the cursor and objects within the virtual landscape. If the UID 84 is a device capable of motion in three dimensions, force feedback in the Z direction is preferably also provided. The occurrence of a collision is determined by a comparator 96 coupled with the CPU 72 and also a Z buffer 98, the Z buffer holding corresponding depth values for the screen's base pixel values within the frame buffer 82 and generally used for hidden surface removal in known fashion. On determining that a collision has occurred an impact calculation stage 100 coupled to the cursor motion memory 88 determines the force and direction of feedback to be supplied to the feedback devices 92,94 within the UID 84 based on the preceding velocity of the cursor and any nominal inertia assigned thereto.

Prior to being applied to the force feedback devices 92,94, the horizontal and/or vertical impact forces are modulated at stage 102 by differentials Dx and Dy of the respective tone gradients derived at stages 104 and 106 respectively from a patch buffer 108 coupled to the rendering stage 70. As with the embodiment of FIG. 3, a patch address PADDR from the CPU 72 identifies the pixels to be used for derivation of the tone gradients to the patch buffer 108. The modulation applied by stage 102 may be just a simple addition such that the impact force feedback is specified for a particular component position within the virtual environment and on top of this is the force corresponding to the overlaid texture. With such modulation, surfaces modelled within the three dimensional environment of the virtual landscape provide texture feedback in like manner to the simple two dimensional user interface described above.

As explained above, the particular form of tactile or force feedback device is not a limiting feature of the present invention. However, for the sake of illustration, some example configurations will now be described with reference to FIGS. 5 to 8.

Figure 5:
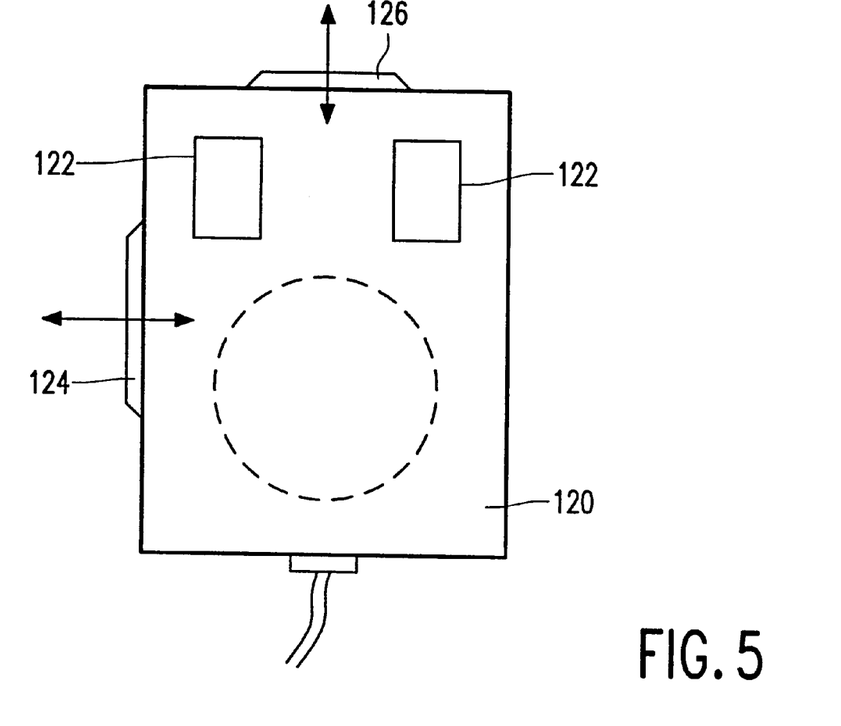
FIGS. 5 to 8 represent different configurations of cursor control devices incorporating tactile feedback mechanisms which may be suitable used in conjunction with the present invention.
Figure 6:
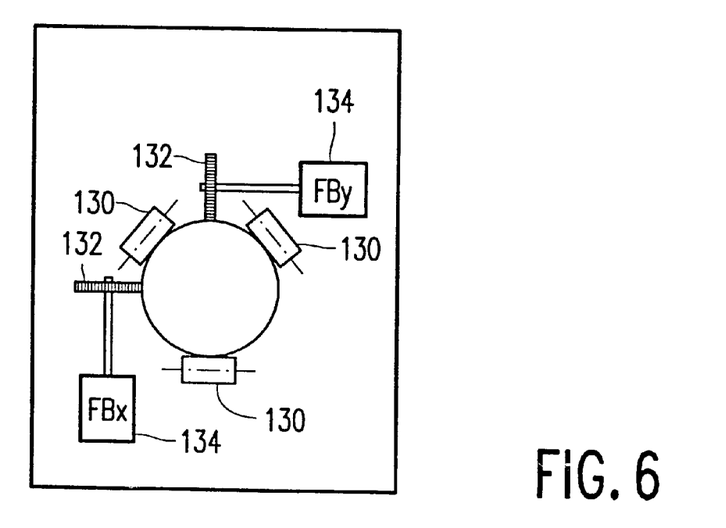

FIG. 5 is a plan view of a simple mouse controller 120 with a pair of operating switches 122, one of which may be used to toggle the tactile feedback on or off. A first actuator 124 at the side of the mouse moves in and out to an extent and with a speed determined by the horizontal feedback force and impinges on the user's thumb (a mouse with the actuator 124 on the opposite side of the casing will be required for left hand operation). At the front of the mouse is a second actuator 126 which moves against the user's finger tips to provide feedback calculated in the vertical direction. This arrangement has the advantage that smooth movement of the mouse is not affected, although the device itself may be rather bulky. An alternative arrangement of mouse which actively uses motion braking to provide the force feedback is schematically illustrated by the under-side plan schematic of FIG. 6. In addition to the conventional three support and motion detection rollers 130, a pair of friction wheels 132 are provided on shafts of respective braking motors 134. The force feedback is provided in the form of a braking current applied to the windings of motors 134 to oppose the direction of rotation of friction wheels 132.

Figure 7A:
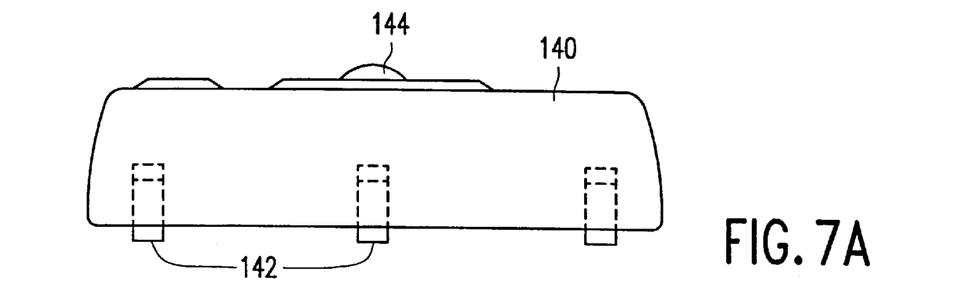
Figure 7B:
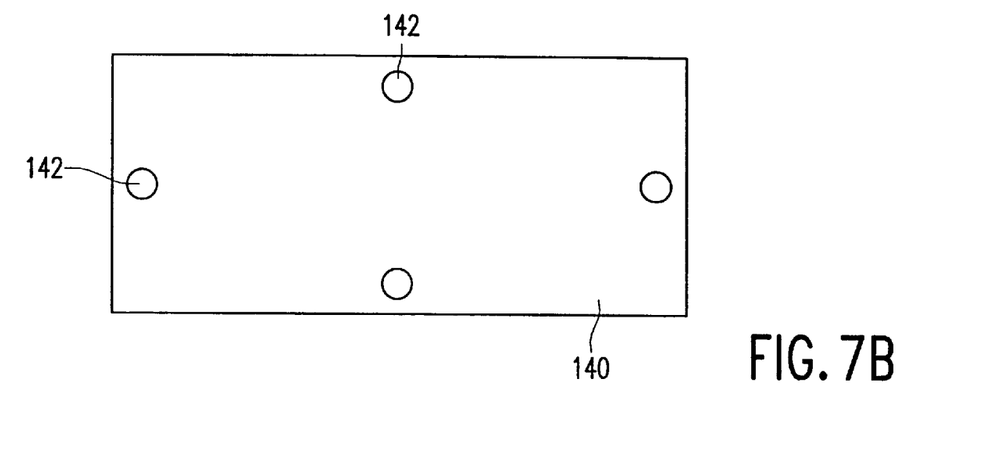

An arrangement of tactile feedback actuators for a trackerball device 140 is illustrated in side elevation and underside plan views in FIGS. 7A and 7B respectively. Four actuators 142 are positioned on the under side of the device and act as support feet for it. Each of the actuators 142 is capable of controlled extension or retraction by an amount determined by the feedback level required in the horizontal and/or vertical direction such that the casing of the trackerball device may be tilted forwards and backwards in both the X and Y directions to provide the tactile feedback without impinging on movement of the rotating ball 144.

Figure 8:
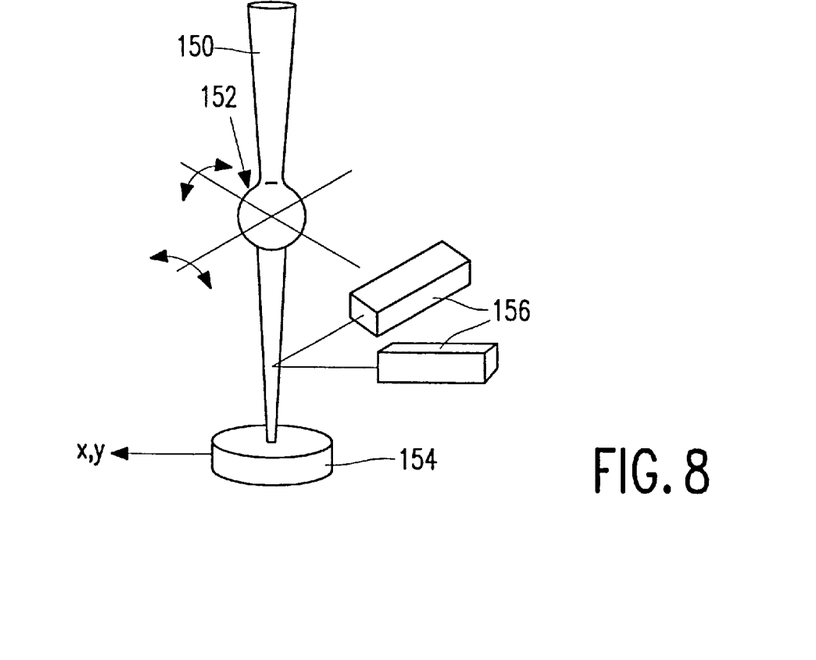

A still further embodiment, in terms of a joystick device, is shown in FIG. 8. The joystick 150 is mounted on a rotating joint 152 and coupled with a position sensor 154 which outputs an indication of movement in the X and Y directions. The feedback is provided by a pair of actuators 156 mounted perpendicularly and coupled via links 158 to an extension of the joystick 150, the actuators 156 operating to oppose movement of the joystick to an extent determined by the specified feedback level.

From reading the present disclosure, other modifications and variations will be apparent to persons skilled in the art. Such modifications and variations may involve equivalent features and other features which are already known in the art and which may be used instead of or in addition to features already disclosed herein. Although claims have been formulated in this Application to particular combinations of features, it should be understood that the scope of the disclosure of the present application includes any and every novel feature or any novel combination of features disclosed herein either explicitly or implicitly and any generalisation thereof, whether or not it relates to the same invention as presently claimed in any Claim and whether or not it mitigates any or all of the same technical problems as does the present invention. The Applicants hereby give notice that new claims may be formulated to such features and/or combinations of such features during prosecution of the present application or of any further application derived therefrom.

I claim:

1. A cursor control system for controlling a cursor on a pixel display, comprising:
   a control means for generating cursor control signals and transmitting said cursor control signals to said display;
   a feedback means for indicating to an operator of said cursor control device a parameter setting; and
   monitoring means arranged to determine a tone level for at least a first pixel of the display overlaid by the cursor, said parameter setting indicated to the user being derived by feedback control means at least partly from the determined tone level.

2. Apparatus as claimed in claim 1, wherein the feedback means is operable to output a continuously varying feedback level directly determined by the instantaneous tone level.

3. Apparatus as claimed in claim 1, wherein the monitoring means is arranged to determine tone level in one or more further areas surrounding the first area, to determine a differential for tone variation in at least one direction across the first and further areas, and to generate the feedback to the user at a level determined by the instantaneous differential.

4. Apparatus as claimed in claim 3, wherein the monitoring means is arranged to determine differentials in two mutually perpendicular directions across the first and further areas, and the feedback means comprises two independently operated feedback means respectively indicating tone variation in the two directions.

5. Apparatus as claimed in claim 3, wherein the monitoring means includes cursor pixel storage means arranged to maintain a record of overwritten display pixel values, and the differential for tone variation is derived from the tone variation along the line of the cursors recent movement.

6. Apparatus as claimed in claim 1, wherein the display represents a three-dimensional computer-generated environment and the cursor is an icon movable under user control in said three dimensions, the apparatus including collision detection means operable to determine when the cursor is in contact with features of the virtual environment, with the feedback means becoming operable while such contact is maintained.

7. Apparatus as claimed in claim 1, wherein the feedback means includes force generation means arranged to apply a force to the body of a user of the apparatus at a level determined by a predetermined external condition and modulated by an amount derived from the determined tone level.

8. A computer system, comprising:
   a pixel display for displaying a cursor;
   a host computer coupled to said pixel display;
   cursor control means for generating cursor control signals coupled to said host computer,
   said host computer receiving said cursor control signals, generating cursor display signals and sending said cursor display signals to said pixel display, and
   said cursor control means comprising a feedback means for indicating to an operator of said cursor control means a parameter setting; and
   monitoring means arranged to determine a tone level for at least a first pixel of the display overlaid by the cursor, said parameter setting indicated to the user being derived by feedback control means at least partly from the determined tone level.

9. Apparatus as claimed in claim 8, wherein the tone level determined is the grey level for the said at least one pixel.

10. Apparatus as claimed in claim 8, wherein the tone level determined is the level of one or more pixel color components for the said at least one pixel.

11. Apparatus as claimed in claim 8, wherein the feedback means operates when the determined tone level exceeds a first threshold value.

12. Apparatus as claimed in claim 8, wherein the feedback means is operable to output a continuously varying feedback level directly determined by the instantaneous tone level.

13. Apparatus as claimed in claim 8, wherein the monitoring means is arranged to determine tone level in one or more further areas surrounding the first area, to determine a differential for tone variation in at least one direction across the first and further areas, and to generate the feedback to the user at a level determined by the instantaneous differential.

14. Apparatus as claimed in claim 13, wherein the monitoring means is arranged to determine differentials in two mutually perpendicular directions across the first and further areas, and the feedback means comprises two independently operated feedback means respectively indicating tone variation in the two directions.

15. Apparatus as claimed in claim 13, wherein the monitoring means includes cursor pixel storage means arranged to maintain a record of overwritten display pixel values, and the differential for tone variation is derived from the tone variation along the line of the cursors recent movement.

16. Apparatus as claimed in claim 8, wherein the display represents a three-dimensional computer-generated environment and the cursor is an icon movable under user control in said three dimensions, the apparatus including collision detection means operable to determine when the cursor is in contact with features of the virtual environment, with the feedback means becoming operable while such contact is maintained.

17. Apparatus as claimed in claim 8, wherein the feedback means includes force generation means arranged to apply a force to the body of a user of the apparatus at a level controlled by the determined tone level.

18. Apparatus as claimed in claim 8, wherein the feedback means includes force generation means arranged to apply a force to the body of a user of the apparatus at a level determined by a predetermined external condition and modulated by an amount derived from the determined tone level.

19. Apparatus as claimed in claim 8, further comprising audio feedback means arranged to generate a user-audible indication of the determined cursor pixel tone level.

* * * * *